March 24, 1964    F. R. ABBOTT    3,126,520
TRANSDUCER
Filed July 26, 1960    5 Sheets-Sheet 1

INVENTOR.
FRANK R. ABBOTT
BY
ATTORNEYS

INVENTOR.
FRANK R. ABBOTT

March 24, 1964  F. R. ABBOTT  3,126,520
TRANSDUCER
Filed July 26, 1960  5 Sheets-Sheet 3
Fig. 4
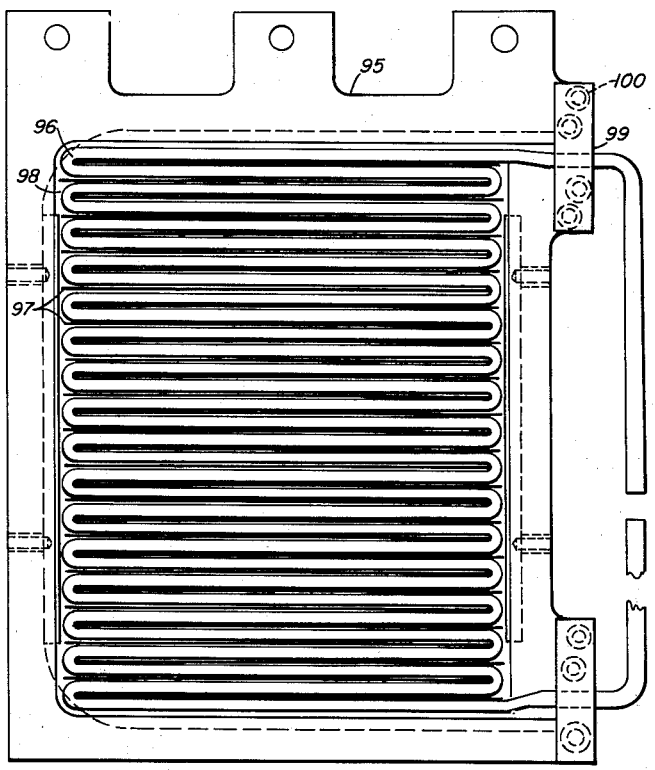
Fig. 5
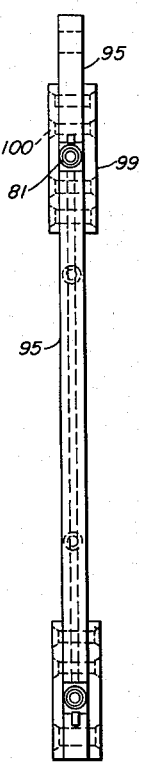
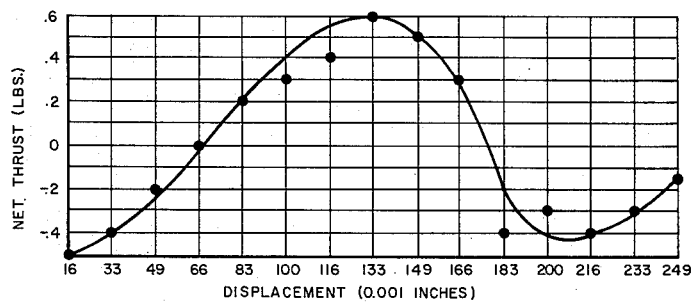
Fig. 10
INVENTOR.
FRANK R. ABBOTT
BY
ATTORNEYS March 24, 1964     F. R. ABBOTT     3,126,520
TRANSDUCER
Filed July 26, 1960     5 Sheets-Sheet 4
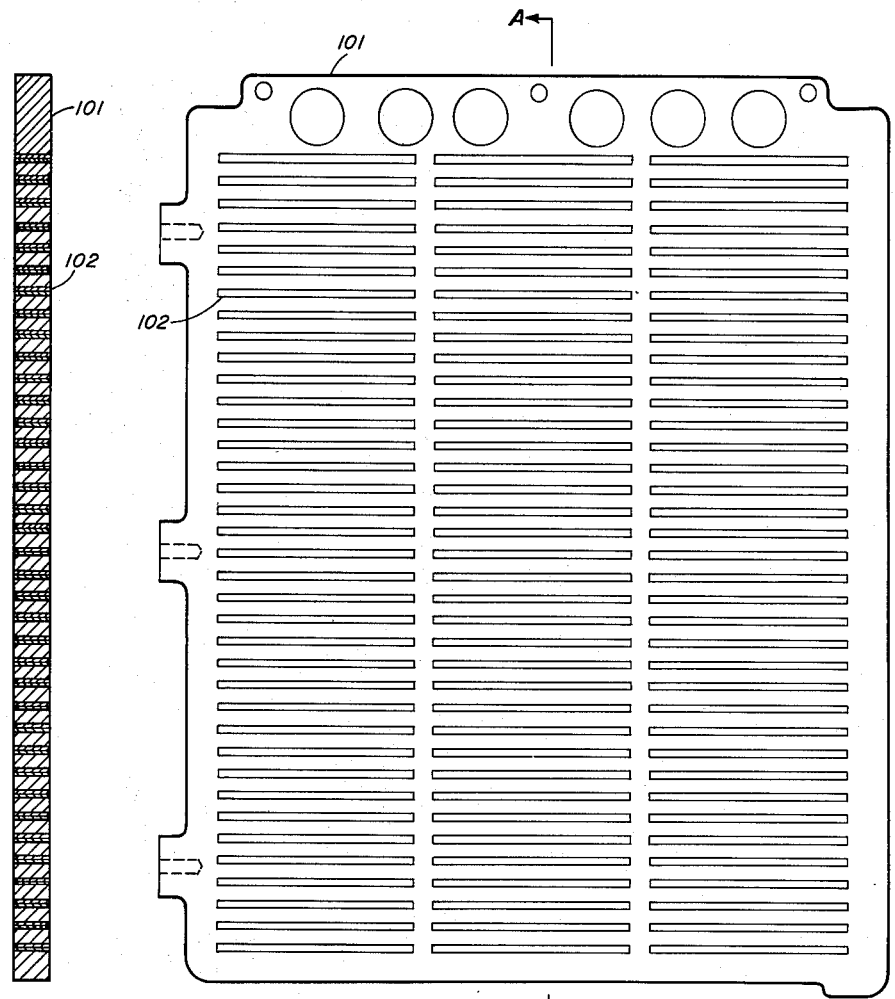
Fig. 7
Fig. 6
INVENTOR.
FRANK R. ABBOTT
BY
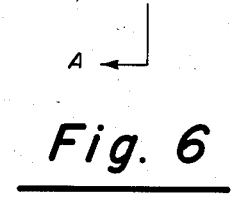
ATTORNEYS March 24, 1964   F. R. ABBOTT   3,126,520
TRANSDUCER
Filed July 26, 1960   5 Sheets-Sheet 5

INVENTOR.
FRANK R. ABBOTT
BY
ATTORNEYS

United States Patent Office 3,126,520
Patented Mar. 24, 1964

3,126,520
TRANSDUCER
Frank R. Abbott, 3953 Wildwood Road,
San Diego 7, Calif.
Filed July 26, 1960, Ser. No. 45,513
9 Claims. (Cl. 340—8)
(Granted under Title 35, U.S. Code (1952), sec. 266)

The invention described herein may be manufactured and used by or for the Government of the United States of America for governmental purposes without the payment of any royalties thereon or therefor.

This invention relates to energy convertors in general and in particular to interleaved-plate electrodynamic and electromagnetic broadband transducers for projecting and receiving acoustical energy within the twenty to two-thousand cycles per second frequency range with high power output. Even more specifically, this invention pertains to a small-sized, twin-piston, laminar-plate, large-excursion transducer which may be employed as a vibration and compressional wave generation means or an underwater sonic energy projector.

The similar type devices of the prior art either use a moving cylindrical coil element without any iron contained therein or, as in the conventional variable reluctance diaphragm type, have moving iron elements and, consequently, considerably limited amplitude. The moving, non-ferrous, cylindrical coil element has the disadvantage of consuming an undue amount of space for the active volume occupied and is usually somewhat fragile, structurally speaking. The long iron path in a variable reluctance unit also consumes undue volume, particularly for the power derivable therefrom. As a result, such prior art devices are usually cumbersome and their power output per unit weight and volume leaves a great deal to be desired. Moreover, conventional electrodynamic and sonar transducers are ordinarily characterized as having low fidelity, since their ability to respond to a wide range of frequencies is not flat and is, therefore, inadequate in many instances, and their power conversion efficiency may be low for frequencies other than perhaps a relatively narrow band.

The present invention is an improvement over the prior art in that the amplitude of excursion of the energy projection means is not limited by pole face contact and, hence, its space consumption per unit power output is considerably reduced. This is effected by a structure embracing two oppositely disposed movable guided pistons actuated by the interaction of a pair of sets of unique, interleaved, electromagnetically energized plates attached thereto, respectively. Due to the above mentioned unlimited excursion, as effected by the foregoing structure, the ability to respond to a wide range of frequencies is improved and the power conversion efficiency is increased considerably.

It is, therefore, an object of this invention to provide a compact transducer having a high power output per unit weight and volume.

Another object of this invention is to provide an improved transducer having a wideband, substantially flat, frequency response and increased power efficiency.

A further object of this invention is to provide an energy convertor for broadcasting and receiving low frequency sound under water.

A further object of this invention is to provide an improved electromechanical vibrator suitable for shake-testing any given equipment, such as, for example, rocket and jet engine assemblies, within a relatively broad spectrum of amplitudes and frequencies.

Still another object of this invention is to provide an electrodynamic transducer having a projector surface excursion that is not limited by pole face contact.

A further object of this invention is to provide a sound source having radial, underwater, sonic energy projecting power which is substantially independent of frequency within the one-hundred to several thousand cycles per second range for a given constant input voltage.

Another object of this invention is to provide an electroacoustical transducer having no adverse resonant properties within the operating frequency range.

Another object of this invention is to provide an underwater acoustical energy transducer adapted for having static water pressure compensation effected by pressurized air or other gaseous fluids.

Another object of this invention is to provide a high power, low frequency, underwater sound projector with substantially omnidirectional radiation characteristics and unlimited frequency response or band width.

A further object of this invention is to provide an improved transducer having an input power-weight ratio of over one kilowatt per pound, which is approximately ten times greater than conventional electro-magnetic devices of comparable type.

Another object of this invention is to provide an improved electro-dynamic transducer that is capable of being water-cooled for effecting increased power output.

Still another object of this invention is to provide an improved electrodynamic transducer that may be lap-wound for producing two-phase alternating current operation and increased excursion in accordance therewith.

Last but not least, it is an object of this invention to provide an improved reversible electroacoustical transducer that is rugged, easily manufactured and maintained, and manually manipulatable and transportable.

Other objects and many attendant advantages of this invention will be readily appreciated as the same becomes better understood by reference to the following detailed description when considered in conjunction with the accompanying drawings wherein:

FIG. 4 is an elevational view of an electromagnetic-fluid cooled plate which may be employed as either the A.C. armature plate or D.C. field plate or both.

FIG. 5 is an end view of the plate of FIG. 4.

FIG. 6 is an elevational view of a permanent magnet plate which may be employed as the motor assembly field plate in lieu of the plate of FIG. 4.

FIG. 7 is a cross-sectional of the permanent magnet field plate taken at A—A of FIG. 6.

FIG. 10 is an exemplary curve of static thrust vs. piston displacement that may be expected per each pair of motor plates of the subject invention.

Figure 1:
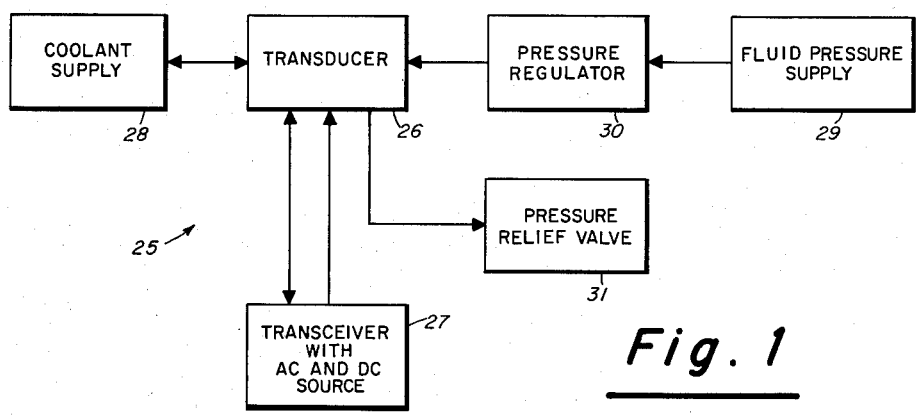
FIG. 1 is a block diagram of an exemplary system incorporating the transducer of this invention.

Referring now to the drawings, there is shown in FIG. 1 an energy propagation system 25 containing a transducer 26 having a transceiver 27 with A.C. and D.C. sources connected for supplying intelligence signals and power thereto. In addition, a coolant supply 28 is appropriately connected to transducer 26 for cooling same as desired during high power operation. A fluid pressure supply 29 is likewise coupled through a demand type pressure regulator 30 to transducer 26 for supplying pressurized air or other gaseous fluids thereto in accordance with a predetermined differential pressure between the inside and outside for zero setting thereof and for static water-pressure compensation. Another demand type relief valve pressure regulator 31 relieves the pressure inside the transducer housing in event that it becomes excessive as the water depth of the transducer is reduced or for any other operational reason.

Although not shown in FIG. 1, any support structure necessary to mount the aforementioned items in any predetermined disposition should be understood as being included in this teaching.

Figure 2:
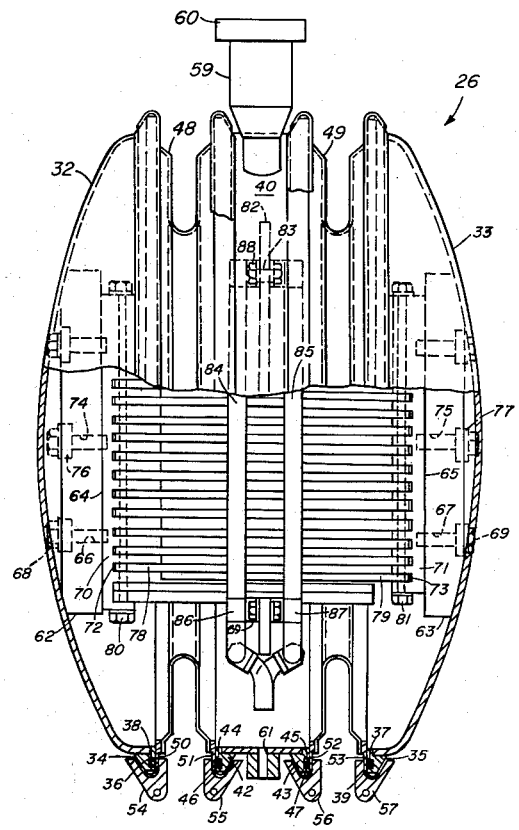
FIG. 2 is an elevational view of the subject transducer with parts broken away and parts shown in phantom.
Figure 3:
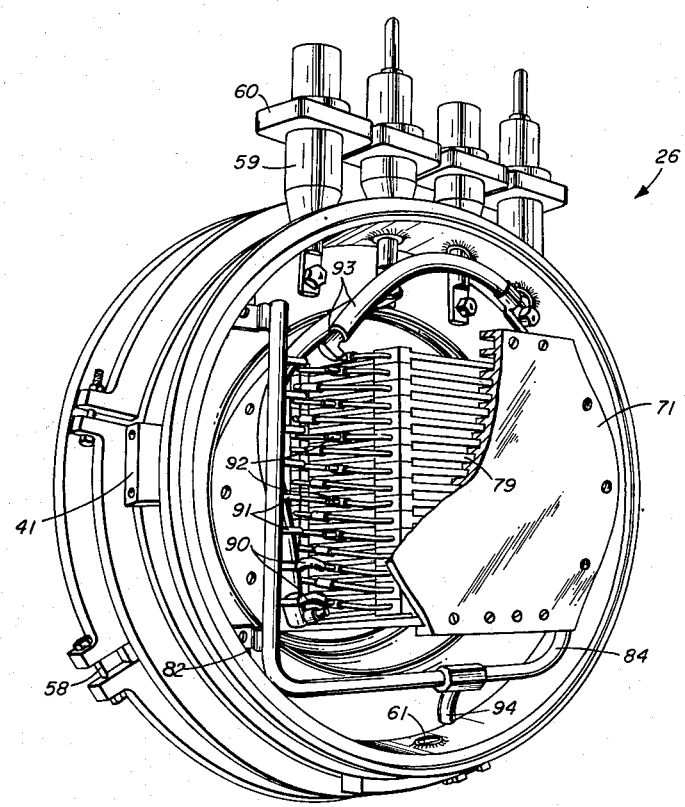
FIG. 3 is a perspective view of a partially assembled portion of the transducer illustrated in FIG. 2 with a bellows and a piston removed from one end and with parts broken away to further disclose the general arrangement of the motor plate assembly.

Referring now to FIGS. 2 and 3 in particular, an elevational view of a preferred embodiment of the transducer constituting this invention is shown as having a left hand piston 32 and a right hand piston 33 spacially and oppositely disposed from each other. Around the outer periphery of said pistons at their inner extremity are a pair of lips 34 and 35 respectively fastened thereto, and disposed within the inner surfaces thereof are a pair of grooves or recesses 36 and 37 adapted to receive O-rings 38 and 39 of rubber or any other appropriate resilient sealing material. Disposed at essentially the mid-position between said pistons is a center housing 40 having mounting lugs 41 likewise having a pair of lips 42 and 43 fastened around the periphery of the outer extremities. These lips also contain grooves or recesses 44 and 45 within the outer surfaces thereof for reception of O-rings 46 and 47 of rubber or comparable resilient sealing material. Interposed respectively between said left hand piston, said housing, and said right hand piston are bellows 48 and 49 of metal or the like adapted to be expanded or contracted within their elastic limit along a predetermined axis of revolution to allow the distance between said pistons to be varied while guiding or controlling their movement in all directions other than along said axis. Bellows 48 and 49 each have a pair of rigid rings 50 and 51 and 52 and 53 integrally attached thereto respectively and adapted for mating with the surface of the aforesaid lips in such manner that a watertight seal will be effected thereat by the aforementioned O-rings. Wedge clamps 54, 55, 56, and 57 tightened by a plurality of substantially identical bolts 58 fasten said pistons, bellows, and housing together, thereby providing a strong, sturdy, compact, waterproof unit. A plurality of entrance and exit conduits 59 of any desired number having flanges 60 adapted for being connected in a watertight manner to pertinent conduits containing electrical cables, hydraulic and pneumatic piping, and the like, which are, in turn, respectively coupled to the aforementioned transceiver, coolant supply, and pressurizing fluid supply. Said flanged conduit may also be employed as mounting members in event that it is desired to mount the entire subject transducer on a supporting platform by way of said interconnecting conduits. An aperture 61 may be employed as an entrance or exit for the aforementioned items if so desired, or may be plugged, or otherwise sealed to make the internal space of the transducer watertight. Of course, mounts 41 may be used in lieu of or in addition to the above mentioned conduit mounting members, in event a stronger more rigid mounting means is preferred.

Integrally connected to the inside surfaces of pistons 32 and 33 are a pair of support rings 62 and 63 having flat inner surfaces 64 and 65 and a plurality of bolt holes 66 and 67 normal thereto and extending through said rings and pistons adapted for receiving a like plurality of bolts 68 and 69. Thickened metal end plates 70 and 71 having a plurality of milled slots 72 and 73 disposed along the inner surface thereof and bolt holes 74 and 75 on the other side thereof are rigidly mounted against the flat surfaces of said rings and fastened by means of said bolts 68 and 69 extending through waterproof seals or gaskets 76 and 77 and the aforementioned bolt holes.

Respectively set in milled slots 72 and 73 are a like plurality of armature plates 78 and field plates 79 which are fastened therein by means of long bolts 80 and 81. Said slots are positioned along their respective end plates in such manner as to allow alternate interleaving of the aforesaid armature and field plates. When interleaved, a piston drive motor assembly results. Sufficient gaps are left therebetween in order to facilitate relative movement thereof without physical interference. Although not shown in the drawing, appropriately contained ball bearings or bearing surfaces of other types may be inserted between adjacent motor plates to further facilitate movement thereof and, at the same time, maintain substantially constant gaps therebetween.

Also, although not evident from FIGS. 2 and 3, the aforementioned armature and field plates may be identical and adapted to individually create a varying magnetic field thereabout, respectively, if an alternating current is applied thereto. Hence, if an A.C. current is applied to the armature plates and a D.C. current is applied to the field plates, an electrodynamic motor results.

On the other hand, field plates containing appropriately disposed permanent magnets may be substituted for the D.C. energized plates to effect an electromagnetic motor which functions equally well or better than said D.C. energized field plates for many operations. Each of the aforementioned types of plates and their operations and uses will be specifically disclosed and discussed further in detail below.

Attached to the inside of the housing wall is a plurality of lugs 82 having bolt holes 83 adapted for mounting a pair of coolant fluid manifolds 84 and 85 thereon by means of clamps 86 and 87 and associated bolts 88 and 89. Flexible, electrically nonconductive hoses 90 of rubber or the like have one of their ends connected to said manifolds by means of clamps or fittings 91 with the other ends likewise adapted for leakproof connections to the plates of the aforementioned drive motor by means of similar clamps or fittings 92. It has been found to be preferred that the cooling system of the drive motor plates be connected in parallel to obtain optimum heat exchange between said plates and the coolant fluid, although for numerous occasions, the use of series connections are quite satisfactory. It has also been ascertained that for many purposes it is desirable to electrically connect the motor plates in series, although in some instances, parallel connections are preferred. Obviously, the drive motor plates may have their cooling systems connected in parallel and their electrical circuits connected in series by electrical conductors 93 and pipe or hose 94, or vice versa, or in any other arrangement amounting to a combination thereof without violating the spirit and scope of this invention, since so doing would be well within the purview of one skilled in the art after consideration of the teachings of the subject invention herein disclosed.

Referring now to FIGS. 4 and 5, there is shown a detailed view of one embodiment of the aforementioned A.C. or D.C. plates. Because they may be structurally identical, only one plate will be described. Strength and substantial rigidity is effected in these plates by a frame 95 of micarta, aluminum, magnesium, plastic, or other suitable nonmagnetic type material. Within said frame are acrylic resin insulated switchback electrical windings 96 formed of hollow copper or aluminum tubing or other comparable electrically conductive but nonmagnetic material. Said windings are disposed in such a configuration that the back and forth portions thereof are substantially parallel to each other and normal to both the force field and movement of the entire plate during excitation thereof. Because said tubing is hollow, it is not only used as an electrical conductor for producing an electromagnetic field, it may also be simultaneously employed as a fluid carrying conduit for plate cooling purposes when properly connected to a coolant source. As previously mentioned, in general, it has been found desirable to connect each of the A.C. plates and D.C. plates in parallel for efficient cooling thereof. While at the same time, it has sometimes been found to be desirable to electrically connect each of the A.C. plates and each of the D.C. plates as separate sets of series connected plates in order to obtain optimum electromagnetic efficiency; however, obviously, they may be parallel connected if so desired, and under certain circumstances it may, indeed, be preferable to do so. Either or both of the above mentioned arrangements may be effected by using electrically nonconductive hose or the like as connectors between each of said plates and their coolant supply to insulate same from the entire electrical portion of the system while appropriately wiring said sets of plates for the desired electrical operation. So doing, of course, is within the teaching of the foregoing and, obviously, is well within the purview of one skilled in the art. However, an important factor in either the series or parallel arrangement of either the electrical circuits or the hydraulic cooling system of this invention is the fact that switch back windings 96 simultaneously function as conductors of electrical energy and cooling fluid for accomplishing advantageous dual purposes at the same time which, in turn, effects improved operational results.

Disposed between or within (depending upon your point of view) each adjacent tubular winding is a plurality of conventional insulated core laminations 97 of silicon iron or the like for providing increased flux paths and strengthened magnetic field forces between the assembled A.C. and D.C. plates. Suitable potting material 98, such as plastic or the like, is disposed within the unoccupied portions thereof to fill the spaces between all of the aforementioned plate elements, in order to structurally support same in the prearranged positions and simultaneously insulate each from the other electrically without insulating or isloating said assembled A.C. and D.C., plates from each other magnetically.

Although the present invention is disclosed in the drawing as having single phase electrical windings, two or more phase operation and resulting increased field forces and thrust may be effected by appropriately lap-winding the tubular conductors within the aforementioned armature and field plates, if so desired.

Brace plates 99 secured to frame 95 by means of recessed bolts 100 may be used to increase rigidity and strength of said frame and hold pertinent portions thereof in their proper positions.

In addition, if so desired, the aforementioned D.C. field plates requiring an external direct current power supply may be replaced with field plates containing permanent magnets instead, which, of course, require no external power source. FIGS. 6 and 7 depict such a field plate as having a frame 101 which, the like frame 95, may be of micarta, aluminum, magnesium, plastic, or other suitable nonmagnetic material for supporting a plurality of permanent magnets 102. If so desired, the external dimensions of frame 101 may be such as to give it a shape that is identical with that of frame 95; however, any suitable shape may be used which will allow it to be interleaved with associated A.C. armature plates 78 without physical interference therebetween which would prevent or hamper relative movement thereof. Of course, the foregoing permanent type plate may be substituted in the subject transducer for the aforementioned direct current excited electromagnetic type plates because they are interchangeable therewith and, when so substituted, they become the field plates of the motor assembly. Obviously, the permanent magnet type plates require no D.C. or other external electrical excitation in order to provide the necessary magnetic flux.

The operation of the foregoing A.C.-D.C. excited embodiment of the transducer constituting this invention is summarized briefly as follows:

The inner chamber portion of the transducer is appropriately pressurized with air or other gaseous fluid supplied thereto from the pneumatic fluid pressure supply. The pressure inside said chamber, however, is set and maintained by the concomitant operations of a preset demand pressure regulator and a relief valve. In accordance with said pressure, a force is applied against the inner walls of the pistons, moving them outwardly against the pressure of the sea water or other environmental medium to selectively position the armature and field plates effectively attached thereto at a preferred relative position in order to effect optimum magnetic interaction therebetween. Hence, it can be seen that, in essence, operationally favorable zero or reference datum control positions of the armature and field plates is provided as necessary to produce the desired transducer performance under any ambient environmental conditions.

After said plates are so positioned, a direct current is applied to the field plates, causing a constant magnetic field to occur thereat. Then an alternating current is applied to the armature plates to create a variable magnetic field thereabout which interacts with the constant magnetic field of the field plates, causing relative movement to occur therebetween in a direction normal to the to and fro portions of the tubular electrical windings contained therein in accordance with the amplitude, frequency, and polarity of said alternating current at any given instant. Since, the armature and field plates are effectively connected to the pistons, they, too, are moved therewith along a substantially predetermined axis controlled by the expansion, contraction, and natural limitation characteristics of the bellows connected thereto.

Operating in conjunction with the abovementioned electrical and pneumatic systems, the coolant system supplies distilled cooling water or any other appropriate cooling fluid to the hollow tubular windings of the A.C. armature and D.C. field plates. As the coolant passes through the tubular windings, heat is transferred thereto from and through the walls thereof from the entire plate as well. The excess heat is then dissipated by means of a conventional heat exchanger or the like in the coolant supply system to the environmental medium within which the transducer is operating or otherwise as desired. Appropriately cooling the subject transducer, of course, allows it to function at a high power, and cooling it in this manner, i.e., using hollow tubular windings in the A.C. and D.C. plates that will simultaneously provide electrical and coolant paths in contiguous proximity with each other, results in considerably improved operational efficiency and physical compactness, in addition.

As the pistons are forced outwardly and drawn inwardly by the interacting electromagnetic fields of the armature and field plates, the ambient medium in contact therewith is compressed and rarified, respectively, thereby creating a pressure wave in proportion thereto which is propagated throughout said medium. Whether or not the subject transducer acts as an omnidirectional energy radiating source, is contingent upon the size of the projecting surfaces and their relationship to the wavelength of the signals being broadcast. Therefore, appropriate selection thereof to make said surfaces less than a half wavelength long or greater than a half wavelength long results in corresponding omnidirectional or substantially unidirectional characteristics, or some other predetermined directivity characteristic depending upon any chosen intermedium dimension. So doing, of course, merely involves the design choice of the artisan after due consideration of the various and sundry operational parameters intended to be employed and, obviously, would be well within the purview thereof in the light of the teaching herein presented.

The operation of the embodiment employing permanent magnet field plates is identical with the embodiment using the D.C. field plates with the exception that no direct current is required or supplied thereto in order to create a polarized magnetic field, inasmuch as the proper disposition of the permanent magnets inherently provide same.

Figure 8:
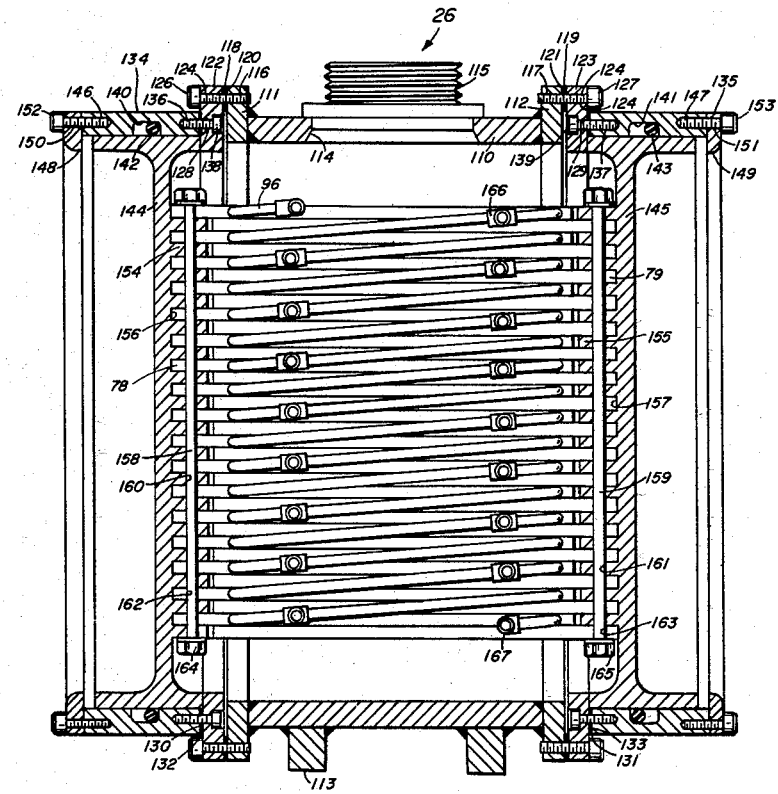
FIG. 8 is an elevational cross-sectional view of another embodiment of the subject invention.

Referring now to FIG. 8, the elevational cross section of another preferred embodiment of the subject transducer is illustrated as having a housing or case 110 having flanges 111 and 112 at the outer extremities thereof, mounting members 113 and an aperture 114 adapted for connection of any appropriate fitting 115 for zero setting and static pressure compensation purposes as will be further explained below. Said flanges have a plurality of preferably uniformly-spaced, tapped, bolt holes 116 and 117 disposed near the outer periphery thereof. Abutting the outer ends of said flanges are a pair of gaskets 118 and 119 having a plurality of holes 120 and 121 matching holes 116 and 117, and abutting said gaskets are a pair of rings 122 and 123 having a similar plurality of bolt holes 124 and 125 appropriately aligned with the aforesaid flange and gasket holes. Bolts 126 and 127 fasten said rings, gaskets, and flanges tightly together in such manner that a water-tight seal is produced. Rings 122 and 123 having another plurality of bolt holes 128 and 129 uniformly disposed with their centers located radially equidistant from centers coinciding with the aforesaid axis of revolution. Mounted in contact with the outer surface of said rings is another pair of gaskets 130 and 131 having a plurality of holes 132 and 133 matching the aforementioned ring holes 128 and 129. A pair of cylinders 134 and 135 have tapped bolt holes 136 and 137 at one end thereof adapted to be aligned respectively with said ring and gasket holes for allowing the fastening of said cylinders to said rings by means of a plurality of bolts 138 and 139 in such manner that a water-tight seal is also effected therebetween. It should be noted that ring bolt holes 128 and 129 are countersunk at the inside ends so that the heads of bolts 138 and 139 will not interfere with the mounting of the rings on said flanges. Recesses or grooves 140 and 141 are spacially located intermediate of the ends of said cylinders and are disposed within and around the inner periphery of the walls thereof, and a pair of resilient O-rings 142 and 143 of any suitable materials, such as rubber or the like, are fitted into said grooves in such manner that packing glands are effected, allowing movement of a pair of pistons 144 and 145 disposed in cylinders 134 and 135 which also contain tapped holes 146 and 147 at their outer ends. Lock rings having overhanging lips 148 and 149 and a plurality of holes 150 and 151 are respectively mounted on the ends of cylinders 134 and 135 by means of a plurality of bolts 152 and 153, in order to provide end stops for the pistons and still allow sufficient excursion thereof for all practical operational purposes.

The heads of pistons 144 and 145 have thickened walls 154 and 155, each of which contains a plurality of milled slots 156 and 157 adapted to have the ends of a like plurality of A.C. armature plates 78 and D.C. field plates 79 set therein, respectively, to form an electrodynamic drive motor assembly. A plurality of elongated bolts 158 and 159 extending through holes 160 and 161 in said thickened walls and holes 162 and 163 in the ends of said plates firmly fasten same thereto by means of a like number of nuts 164 and 165. The aforementioned slots 156 and 157 are milled in the respective piston head walls in such manner that their respective inset A.C. and D.C. plates alternate in position in an interleaved manner with a ten mil gap therebetween. The gap, of course, allows relative movement of said plates without adverse physical or electrical interference. If so desired, ball bearings (not shown) or other bearing or support means such as Teflon ribbon may be appropriately disposed between adjacent plates to provide additional strength, and to facilitate movement thereof while accurately maintaining the aforementioned gap. Of course, so doing is merely a matter of design preference, inasmuch as the herein disclosed device functions quite satisfactorily in either case.

The armature and field plates of the embodiment of FIG. 8 are the same as the armature and field plates 78 and 79 of the embodiment of FIG. 2. Moreover, the plate of FIG. 4, i.e., the plate containing the switchback conductors, may be incorporated in the embodiment of FIG. 8 as either the alternating current excited armature plates or the direct current excited field plates as desired, just like in the embodiment of FIG. 2. In event the permanent magnet plates of FIG. 6 are suitable for any given operational conditions, they may likewise be incorporated in the transducer of FIG. 8 as the field plates thereof, and so doing should be considered as part of the teaching of this invention. Therefore, because all of said plates are comparable and interchangeable according to the above teaching, further disclosure thereof is not presented here.

In the view of FIG. 8, the external portion of the electrical and cooling fluid conductors 96 of armature plates 78 are depicted as being adapted for series electrical coupling and parallel fluid coupling. Fittings 166 such as, for example, T fittings or L fittings of metal, plastic, or other suitable material, provide the appropriate electrical and fluid connections as desired. Electrically nonconductive hose 167 may, of course, be used as coupling means to coolant supply 28.

Figure 9:
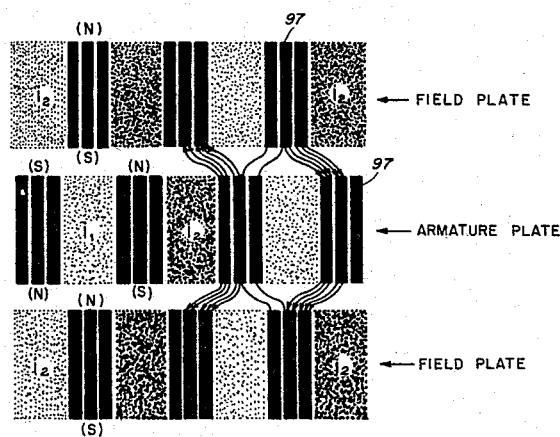
FIG. 9 is a schematic representation of a side view of three motor plates illustrating preferred starting position and the theoretical equivalents of their respective current and associated flux interactions.

In order to more thoroughly understand the transducer constituting the subject invention, the following mathematical analysis of the thrust developed by the last disclosed embodiment type is presented. For the purpose of this analysis, it is assumed that the armature poles are midway between the field poles, as shown in enlarged detail in FIG. 9, and it is arbitrarily presumed that steady state currents pass through the two windings when the pistons are blocked to prevent movement thereof. The symbols used in this analysis are in meter-kilogram-second units and are defined as follows:

$a$—width of iron pole faces
$b$—length of iron pole faces
$c$—height of copper bars (thickness of plate)
$d$—width of copper bars
$e$—back E.M.F.
$f$—force developed through one air flux path bounded by two bars of one plate
$g$—distance between plates
$i$—current
subscript$^j$—left flux path leading into armature iron
subscript$^k$—right flux path leading into armature iron
$n$—number of armature plates
$r$—resistance
$t$—time
$x$—average length of the flux path linking two pole faces, presumed to be $\sqrt{g^2 + (1/4)d^2}$
$A$—average area of flux path linking two pole faces, presumed to be $1/2\,ab$
$N$—number of poles per plate
$R$—reluctance
$T$—total thrust of transducer
$W$ elec—net electrical energy input (minus $i^2r$ losses)
$W$ field—energy stored by coupling field
$W$ mech—internal mechanical energy
subscript$^1$—due to armature windings
subscript$^2$—due to field windings
$\theta$—angle of force between two faces, presumed to be arc cos $d/2x$
$\phi$—average flux per loop formed between two bars
$\mu_0$—permeability of free space
$\rho$—resistivity The force on one slot between two plates may be obtained by considering the change of energy for differential changes in the position of the A.C. armature plates relative to the D.C. field plate. The law of conservation of energy may be stated as:

$$dW \text{ elec} = dW \text{ field} + dW \text{ mech} \qquad (1)$$

$dW$ elec can be expressed in terms of flux and current.

The back E.M.F. developed due to changing flux for one pole and one turn is $$e = d\phi/dt \quad (2)$$
$$dW \text{ elec} = eidt \quad (3)$$
$$dW \text{ elec} = id\phi \quad (4)$$

First, consider the case of no motion:
From (1):

$$dW \text{ elec} = dW \text{ field} + 0$$

From (4):

$$dW \text{ field} = id\phi$$

Now:

$$R = i/\phi \quad (5)$$

and for no motion, we will consider the reluctance R constant.

$$W \text{ field} = \int_0^\phi i\,d\phi = \int_0^\phi R\phi\,d\phi = (1/2)R\phi^2 \quad (6)$$

Suppose that after the energy is stored, the armature moves:

$$dW \text{ field} = (1/2)\phi^2 dR + id\phi \quad (7)$$

Substituting (4) and (7) in (1):

$$id\phi = (1/2)\phi^2 dR + id\phi + dW \text{ mech} \quad (8)$$

So that:

$$dW \text{ mech} = fdx = (-1/2)\phi^2 dR \quad (9)$$
$$f = (-1/2)\phi^2 dR/dx \quad (10)$$

Let us say that the reluctance of each air gap is R and $$R = x/\mu_0 A \quad (11)$$

The reluctance of the iron may be neglected because it is about a thousand times lower than the reluctance of the air gaps. It shall further be presumed that the average area of the flux path is $A = (1/2)ab$, and that this area remains constant. Therefore:

$$\frac{dR}{dx} = \pm \frac{1}{\mu_0 A} \quad (12)$$

the sign depending on the direction of motion.
The flux due to the current in the armature is:

$$\phi_1 = \frac{\mu_0 A i}{2x} \quad (13)$$

The denominator arises because the flux path between armatures is $2x+c$, but the contribution due to $c$ is negligible. The flux due to the current in the field is:

$$\phi_2 = \frac{\mu_0 A i_2}{2x} \quad (14)$$

The total flux entering the left part of the armature pole in FIG. 5 is $$\phi_j = \phi_1 + \phi_2 = \frac{\mu_0 A}{2x}(i_1 + i_2) \quad (15)$$

The total flux entering the right part is $$\phi_k = \phi_1 - \phi_2 = \frac{\mu_0 A}{2x}(i_1 - i_2) \quad (16)$$

From (10)

$$f_j = +\frac{\phi_j^2}{2\mu_0 A} = +\frac{(i_1+i_2)^2}{8x^2}\mu_0 A \quad (17)$$

$$f_k = -\frac{\phi_k^2}{2\mu_0 A} = -\frac{(i_1-i_2)^2}{8x^2}\mu_0 A \quad (18)$$

$$f = f_j + f_k = \frac{i_1 i_2}{2x^2}\mu_0 A \quad (19)$$

There is a top and bottom gap in each flux path of each bar; thus the reluctance per plate gap is doubled. Conversely, on each side of each plate, the force $f$ per bar is contributed.

Presuming that the average length of the air gap is $x = \sqrt{g^2 + (1/4)d^2}$, then the thrust parallel to the plates is $$T = 2nN_f \cos\theta = nN\frac{i_1 i_2 A d}{2x^3}\mu_0 \quad (20)$$

since $\cos\theta = d/2x$.

The thrust of an actual pilot embodiment of the subject invention having three armature plates and two field plates and having the dimensions listed below was measured:

$a = d = 10^{-3} m$
$b = 0.11 m$
$c = 4 \times 10^{-3} m$
$g = 7.5 \times 10^{-4} m$
$n = 2$
$N = 50$
$A = 5.5 \times 10^{-5} m^2$
$x = 1.25 \times 10^{-3} m$ In this instance, the armature and field windings were connected in parallel and the D.C. input current was thirty-three amperes. The graph of FIG. 10 gives a curve of the force developed at various piston displacements when the actual measured force is superimposed on a constant drag curve of 2.5 pounds (not shown). The average of the maximum net thrust turned out to be approximately 0.5 pound, which is considered to be satisfactory correlation with the thrust calculated by means of the above derived thrust formula. According to said formula:

$$T = \frac{2 \times 50 \times (33)^2 \times 5.5 \times 10^{-5} \times 12.57 \times 10^{-7}}{2 \times (1.25 \times 10^{-3})^3}$$

$T = 2$ newtons
$T = 0.44$ pound

Thus, it can be seen that agreement between the actual measured thrust and the theoretically calculated thrust is surprisingly good, considering the simple configuration of the pilot embodiment's flux path.

Summarizing in general, the operation of the transducer constituting this invention is briefly presented below.

Direct current of a given level from a D.C. supply is applied to the windings of the field plates which, in turn, establishes alternate north (n) and south (s) magnetic poles at the silicon-iron strips 97 thereof, respectively. Alternating current of a predetermined amplitude and frequency is likewise applied to the A.C. armature plates, which establishes instantaneous alternate north (n) and south (s) magnetic poles at the silicon-iron strips that reverse and vary in proportion to the frequency and amplitude of the current applied to said armature plates. The interaction of the magnetic field forces of the sets of electrically excited A.C. and D.C. plates causes relative to and fro movement to occur therebetween in a direction normal to the switchback portions of the conductors.

The operation of the system incorporating the immediately preceding preferred embodiment of the transducer constituting this invention is briefly presented below in order to better understand the overall functions and effects thereof.

Like in the first mentioned preferred embodiment, the aforementioned air or gaseous fluid is supplied to the inner portion of the transducer where, under the appropriate pressure, it applies a force against the inside surface of the pistons, moving them outwardly against the pressure of the sea water at any given depth to selectively position the plates respectively attached thereto at a preferred relative position. The demand pressure regulator disposed between the air pressure supply and the transducer housing automatically regulates the amount of air supplied thereto to maintain sufficient pressure therein at all times to position said plates as desired. Working in conjunction with the aforementioned demand pressure regulator to maintain said pressure is the relief valve which, of course, automatically relieves any excessive existing in the transducer housing. Although the [su]bject transducer will function without such relative A.C. [a]nd D.C. plate prepositioning, it has been found that optimum efficiency is effected as a result of it. In addition, pressurization of the subject transducer may be desirable or even necessary at times in order to provide static water pressure compensation which, in turn, may increase operational efficiency a considerable amount, depending on ambient environmental conditions.

Direct current of any practical given level from a D.C. supply is then applied to the field plates which establishes alternate north and south poles at the silicon iron strips of adjacent windings therein. An intelligence signal in the form of an alternating current of a predetermined amplitude and frequency from the transceiver is likewise applied to the armature plates which establishes alternate north and south poles at the silicon iron strips disposed in adjacent windings thereof. Of course, the armature north and south silicon-iron poles reverse and vary in accordance with the frequency and amplitude of said A.C. intelligence input signal. The interaction of the magnetic field forces of the sets of electrically excited A.C. and D.C. plates (or the A.C. and permanent magnet plates, as the case may be) causes relative to and fro movement to occur thereat in a direction normal to the conductor alignment. Although the maximum amplitude of relative excursions of adjacent plates of said sets of A.C. and D.C. plates, as they move to and fro, is made small in comparison with the distance between their respective cores and conductors in order to effect high fidelity operation, they move their respective pistons in such manner as to provide a varying thrust against the substance in contact with the piston heads. Thus, it may be seen that pressurization or compression and dilation or decompression may be effected at or within any given environmental medium in accordance with the use to which the subject transducer is being put during any desired operation thereof.

As explained so far, only relative movement of the opposing pistons have been taken into consideration. However, it would be obvious to one skilled in the art that there is also relative movement between each of said pistons and the transducer housing. Consequently, it may readily be seen that a mounting means may be employed in conjunction with said housing and a supporting platform, such as a ship, submarine boat, aircraft, buoy, dock, or the like, in order to facilitate physical manipulation of the entire transducer and to provide controlled propagation or reception of pressure energy broadcast or received thereby.

In event the subject transducer is used as a shaker means, either or both pistons may be attached through suitable connecting links to the object to be vibrated without violating the spirit and scope of this invention.

If the subject transducer is used as a sonar sound source while being submerged within sea water, the acoustical energy is transferred to said water at the head surfaces of the moving pistons due to contact thereof thereat. As mentioned previously, the transducer must be water-tight if it is to operate satisfactorily under water, and, also, under some circumstances, it may be desirable to internally pressurize the transducer, as mentioned above, to assist in maintaining it in a water-tight condition.

Obviously many modifications and variations of the present invention are possible in the light of the above teachings. It is, therefore, to be understood, that within the scope of the appended claims, the invention may be practiced otherwise than as specifically described.

What is claimed and desired to be protected by Letters Patent of the United States is:

1. A doubled-ended sound projector comprising in combination, a housing, a pair of movable energy projecting means spacially disposed from said housing and each other, means interconnecting said housing and each of said pair of energy projecting means for guiding the relative movement thereof and providing a watertight seal therebetween, a first plurality of plates effectively connected to one of said pair of energy projecting means for producing a constant magnetic field upon excitation by a direct current, a second plurality of plates effectively connected to the other of said pair of energy projecting means for producing a varying magnetic field upon excitation by a variable alternating current, said first and second pluralities of plates being alternately interleaved for relative parallel planar movement with substantially constant gaps therebetween, and means respectively interconnecting each of said pair of energy projecting means and each of said pluralities of interleaved plates for maintaining the aforesaid substantially constant gaps.

2. The device of claim 1 wherein each of said first and second pluralities of plates are identical and comprise a plurality of insulated switchback winding means having substantially parallel conductors in the back and forth portions thereof, means disposed between each of said parallel conductors for increasing the magnetic flux path therebetween, nonmagnetic means associated with all of the aforementioned means for supporting same in a substantially fixed relationship.

3. The device of claim 1 wherein each of said first and second pluralities of plates are identical and comprise a plurality of insulated switchback electrical winding means having substantially parallel coplanar conductors in the back and forth portions thereof, means disposed between each of said conductors for increasing the magnetic flux path therebetween, a nonmagnetic framing means, and potting means disposed within said framing means for electrically insulating and structurally supporting all of the aforementioned means in substantially fixed relationship.

4. A sound source adapted to broadcast acoustical energy through an aqueous medium while being submerged therein comprising in combination, a housing, a first bellows mounted on one end of said housing, a second bellows mounted on the other end of said housing, a first movable piston coupled to said first bellows, a second movable piston connected to said second bellows, first plate means for producing a constant magnetic field force when excited by direct current fixedly connected to said first piston, a second plate means for producing a variable magnetic field force when excited by alternating current disposed in substantially parallel alignment with said first plate means and fixedly connected to said second piston, and power supply means coupled to said first and second plate means for respectively supplying direct and alternating current thereto.

5. An electrodynamic energy convertor comprising in combination, a pair of movable pistons spacially disposed from each other along a common axis of revolution, a plurality of plates respectively connected to said pistons for movement therewith, each of said plurality of plates consisting of means simultaneously conducting electrical energy and a cooling fluid to and fro along a predetermined path for generating a magnetic field thereat while being cooled thereby, core means disposed between said conducting means for increasing the magnetic flux within said magnetic field, and nonmagnetic means interconnecting said conducting means and said core means for electrically insulating and structurally supporting same in a fixed relationship.

6. A transducer comprising in combination, a first movable piston, a second movable piston spacially disposed from said first movable piston, a first set of flat plates connected to said first piston, a second set of flat plates connected to said second piston, each plate of said first and second sets of flat plates being alternately disposed with each other, respectively, with predetermined planar gaps therebetween, housing means, means connected to said housing means for limiting the movement of said pistons, each plate of the above mentioned first and second sets of plates being identical with the others and including insulated means adapted for simultaneously conducting electrical energy and a cooling fluid to and fro along a predetermined planar path for generating a strong magnetic field thereat while being cooled thereby, insulated laminar core means disposed between said conducting means for increasing the paths of magnetic lines of flux within said magnetic field, nonmagnetic means framing said conductor and core means in such manner as to form the periphery of the aforesaid flat plate, and plastic potting means disposed within said framing means for supporting said conducting and core means in a fixed relationship therein.

7. The device of claim 6 wherein said means connected to said housing means for limiting the movement of said pistons consists of a pair of hollow cylinders respectively disposed thereabout.

8. The device of claim 6 wherein said means connected to said housing means for limiting the movement of said pistons consists of a pair of metal bellows respectively coupled thereto.

9. The device of claim 8 further characterized by including a resilient ring means respectively interposed between said pistons and cylinders for forming a watertight seal therebetween without preventing relative movement thereat.

References Cited in the file of this patent

UNITED STATES PATENTS

| | | |
|---|---|---|
| 2,081,619 | Ebert | May 25, 1937 |
| 2,383,383 | Harding | Aug. 21, 1945 |
| 2,789,280 | Harris | Apr. 16, 1957 |
| 2,822,482 | Harris | Feb. 4, 1958 |
| 2,903,673 | Harris | Sept. 8, 1959 |
| 2,947,888 | Harris | Aug. 2, 1960 |
| 2,961,637 | Camp | Nov. 22, 1960 |
| 2,962,695 | Harris | Nov. 29, 1960 |
| 3,056,104 | De Kanskietal | Sept. 25, 1962 |

OTHER REFERENCES

"Interleaved-Plate Electrodynamic Transducer; Part 1: Static Thrust Analysis"; Report 883, Research and Development Report, December 11, 1958, U.S. Navy Electronics Laboratory, San Diego, Calif.